UNITED STATES PATENT OFFICE.

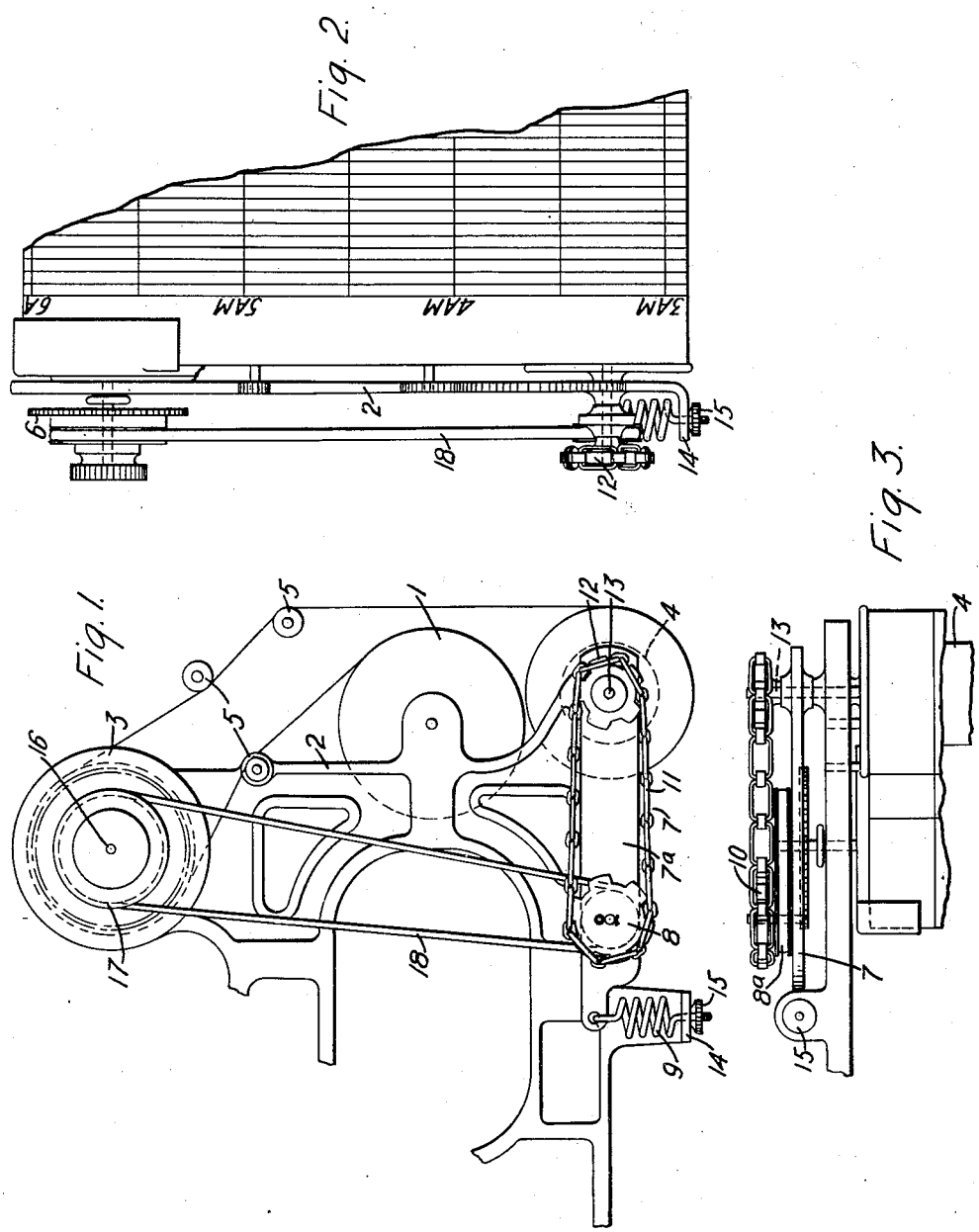

HAROLD B. TAYLOR, OF WILKINSBURG, PENNSYLVANIA, ASSIGNOR TO WESTING-HOUSE ELECTRIC AND MANUFACTURING COMPANY, A CORPORATION OF PENN-SYLVANIA.

REROLLING DEVICE FOR GRAPHIC METERS.

1,189,309.  Specification of Letters Patent.  Patented July 4, 1916.

Application filed September 25, 1914. Serial No. 863,586.

*To all whom it may concern:*

Be it known that I, HAROLD B. TAYLOR, a citizen of the United States, and a resident of Wilkinsburg, in the county of Allegheny and State of Pennsylvania, have invented a new and useful Improvement in Rerolling Devices for Graphic Meters, of which the following is a specification.

My invention relates to rerolling devices, and it has particular reference to devices for rerolling the record paper that is used in graphic or recording instruments.

The object of my invention is to provide a rerolling device that will maintain a substantially constant tension on the record paper, irrespective of the amount that is rolled upon the roller.

Heretofore, rerolling devices for graphic instruments were operated through permanently tensioned belts that were driven by clocks or electric motors. A device of this kind was impracticable because of the inability of the belt to slip properly as the amount of paper rolled upon the roll increased. Thus, the tension on the paper frequently stopped the clock or the motor if the belt did not slip enough, and, if it slipped too much, the paper was fed into other parts of the instrument.

I provide a device that allows the belt to slip substantially in proportion to the tension of the paper on the roller. Thus, the paper is always held taut, and a positive rerolling action is insured.

Figure 1 of the accompanying drawings is a fragmentary side elevational view of a graphic measuring instrument that embodies my invention; Fig. 2 is a fragmentary front elevational view of the instrument shown in Fig. 1 and Fig. 3 is a fragmentary bottom plan view of the instrument shown in Figs. 1 and 2.

A roll 1 of paper is rotatably mounted between brackets 2 that form the supports for the recording mechanism of a graphic measuring instrument. A feeding roller 3 and a rerolling roller 4 are also rotatably supported by the brackets 2 and are so arranged that the paper is fed from the roll 1 by the roller 3, over a plurality of guiding members 5, to the rerolling roller 4. The roller 3 is driven through a gear wheel 6 by a clock mechanism (not shown), and the rerolling roller 4 is driven by the roller 3 through a device 7 that embodies my invention.

The device 7 comprises a pivotally mounted member $7^a$, the pivotal point of which coincides with the axis of the roller 4, a rotatable member 8 and a spring 9. The rotatable member 8 comprises a pulley $8^a$ and a sprocket wheel 10 that drives the roller 4 through a chain 11 and a sprocket wheel 12 mounted on the shaft 13 of the roller 4. The spring 9 is attached, at its upper end, to the pivotally mounted member $7^a$ and, at its lower end, to a stationary projection 14 upon one of the brackets 2. The lower end of the spring 9 is screw threaded and is provided with a knurled head nut 15 for adjusting its tension. The roller 3 is mounted on a shaft 16 which is also provided with a pulley 17 that is connected, by a belt 18, to the pulley $8^a$ of the rotatable member 8.

It will be seen from the drawing that the shafts 13 and 16 are a predetermined distance apart and that the axis of the movable member 8 is also a predetermined distance from the axis of the shaft 13 but a variable distance from the axis of the shaft 16, such distance being dependent upon the relative tensions of the spring 9 and the belt 18. The tension on the belt 18 is, in turn, dependent upon the tension of paper being rolled upon the roller 4.

As the amount of paper that is rolled upon the roller 4 increases, the tension of the paper increases. When this tension increases to a predetermined amount, it is desirable that the belt 18 slip sufficiently to relieve the tension on the paper, so that the roll 3 will be free to operate and, consequently, the clock will not be stopped. It will be readily seen that, when the tension of the belt 18 is increased beyond a predetermined amount which is sufficient to turn the roller 4 in opposition to the required tension of the paper, the spring 9 will become tensioned and the pivotally mounted member $7^a$ will move to reduce the distance between the axis of the roller 3 and that of the rotatable member 8. Thus, the belt 18 will slip an amount proportional to the tension of the paper being rolled upon the roller 4.

Should the tension of the paper decrease below a predetermined amount, the spring 9 would overcome the torque of the roller 4 to tighten the belt 18. Thus, if the spring 9 is correctly adjusted, a substantially constant tension may be maintained on the paper, irrespective of the amount of the same that is rolled upon the roller 4.

I do not limit my invention to the specific structure shown as many modifications may be made therein within the scope of the appended claims.

I claim as my invention:

1. In a rolling device, the combination with a feeding roller, and a receiving roller, of a rotatable member, a belt for operatively connecting the feeding roller to the rotatable member, and a gearing means for operatively connecting the rotatable member to the receiving roller, the tension on the belt being adapted to vary to maintain a substantially constant torque on the receiving roller.

2. The combination with a feeding roller, and a receiving roller, of a transmission device therebetween comprising a rotatable member, a positive driving connection between the rotatable member and the receiving roller, and a belt for operatively connecting the rotatable member and the feeding roller, the friction of the belt being adapted to vary under predetermined conditions to maintain a constant torque on the receiving roller.

3. In a rolling device, the combination with a roller for feeding a flexible fabric and a second roller for receiving said fabric, of a power-transmitting device comprising a rotatable member having a fixed distance between its axis and the axis of the second roller, a flexible connecting means between said first roller and said rotatable member, and means for decreasing the distance between the axis of said rotatable members and that of said first roller in substantial proportion to the increase in tension of the fabric being rolled on said second roller.

4. In a paper rolling device, the combination with a feeding roller and a receiving roller, of a rotatable member mounted on a pivotally mounted arm, a belt for operatively connecting the feeding roller to the rotatable member, and a positive driving means for connecting the rotatable member to the receiving roller, said belt being permitted to slip in accordance with the tension of the paper on the receiving roller.

5. In a paper rerolling device for a recording instrument, the combination with a roll of paper, a feeding roller, and a receiving roller, of a rotatable member mounted on a pivotally mounted arm, a belt for operatively connecting said feeding roller to said rotatable member, and means for operatively connecting said rotatable member to said receiving roller, the tension on said belt being adapted to vary in accordance with the tension of the paper on said receiving roller.

6. In a paper rerolling device for a recording instrument, the combination with a roll of paper, a feeding roller and a receiving roller, of a pivotally mounted arm having a pivotal point coinciding with the axis of said receiving roller, a rotatable member mounted on said pivotally mounted arm that is connected to said receiving roller through a positive driving connection and to the feeding roller through a belt, and a resilient member for varying the distance between the axis of the rotatable member and the axis of said feeding roller.

7. In a re-rolling device, the combination with a roll of paper, a feeding roller and a re-rolling roller, of a rotatable member having a fixed distance between its axis and the axis of the re-rolling roller, a flexible connecting means between the feeding roller and the rotatable member, and means for decreasing the distance between the axis of the feeding roller and that of the rotatable member in accordance with the tension of the paper on the re-rolling roller.

8. A rolling device comprising a feeding roller and a receiving roller having a fixed distance between their respective axes, an auxiliary rotatable member, a belt for operatively connecting the feeding roller to the auxiliary member, a positive driving gearing for operatively connecting the auxiliary member to the receiving roller and a spring for yieldingly restraining the movement of the auxiliary rotatable member toward the feeding roller.

In testimony whereof, I have hereunto subscribed my name this 22nd day of Sept., 1914.

HAROLD B. TAYLOR.

Witnesses:
  B. H. SMITH,
  B. B. HINES.